(12) United States Patent
Moon

(10) Patent No.: US 9,950,662 B2
(45) Date of Patent: Apr. 24, 2018

(54) MULTIFUNCTIONAL LAMP FOR VEHICLE INTERIOR

(71) Applicant: Hyundai Motor Company, Seoul (KR)

(72) Inventor: Seung Ho Moon, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 188 days.

(21) Appl. No.: 14/852,287

(22) Filed: Sep. 11, 2015

(65) Prior Publication Data

US 2016/0121789 A1    May 5, 2016

(30) Foreign Application Priority Data

Nov. 3, 2014    (KR) .......................... 10-2014-0151129

(51) Int. Cl.
| | |
|---|---|
| *B60Q 3/02* | (2006.01) |
| *B60Q 3/82* | (2017.01) |
| *B60Q 3/74* | (2017.01) |
| *B60Q 3/76* | (2017.01) |
| *F21V 14/04* | (2006.01) |
| *F21V 14/08* | (2006.01) |

(52) U.S. Cl.
CPC .................. *B60Q 3/82* (2017.02); *B60Q 3/74* (2017.02); *B60Q 3/76* (2017.02); *F21V 14/04* (2013.01); *F21V 14/08* (2013.01)

(58) Field of Classification Search
CPC .. B60Q 3/0279; B60Q 3/0286; B60Q 3/0296; B60Q 3/74; B60Q 3/76; B60Q 3/82; F21V 14/04; F21V 14/045; F21V 14/06; F21V 14/065; F21V 14/08; F21V 14/085; F21V 17/104
See application file for complete search history.

(56) References Cited

U.S. PATENT DOCUMENTS 5,508,897 A * 4/1996 Van Order ............... B60Q 3/74
                                                    362/287
5,526,241 A * 6/1996 Ferrell ..................... B60Q 3/74
                                                    362/222
(Continued)

FOREIGN PATENT DOCUMENTS

JP           10-67277 A      3/1998
JP        2002-114095 A      4/2002
(Continued)

OTHER PUBLICATIONS

English Machine Translation of JPH10067277 from Espacenet.*

*Primary Examiner* — Jong-Suk (James) Lee
*Assistant Examiner* — Zheng Song
(74) *Attorney, Agent, or Firm* — McDermott Will & Emery LLP

(57) ABSTRACT

A multifunctional lamp for a vehicle interior includes a housing having a light source installed therein. An indirect illumination diffusing lens is disposed in front of the housing to diffuse and emit light of the light source. A concentrated illumination light emitting unit moves back and forth while passing through the light diffusing lens. The concentrated illumination light emitting unit emits the light of the light source toward a front side of the housing through an internal passage of the light emitting unit in the form of concentrated illumination and shields the light diffusing lens from the light when concentrated illumination light emitting unit moves to surround a periphery of the light source.

10 Claims, 4 Drawing Sheets

(56) References Cited

U.S. PATENT DOCUMENTS

| | | | |
|---|---|---|---|
| 7,217,018 B1* | 5/2007 | Chen | B60Q 1/14 |
| | | | 362/284 |
| 7,249,873 B2 | 7/2007 | Tiesler et al. | |
| 2004/0070982 A1* | 4/2004 | Lagonegro | F21V 17/164 |
| | | | 362/359 |
| 2005/0219849 A1* | 10/2005 | Kotovsky | F21S 6/007 |
| | | | 362/321 |
| 2006/0050524 A1* | 3/2006 | Tiesler | B60Q 3/76 |
| | | | 362/523 |
| 2007/0297182 A1* | 12/2007 | Stache | B60Q 3/76 |
| | | | 362/362 |
| 2008/0158900 A1* | 7/2008 | Showalter | B60Q 3/76 |
| | | | 362/490 |
| 2016/0091176 A1* | 3/2016 | Wang | F21V 7/043 |
| | | | 362/277 |
| 2016/0369961 A1* | 12/2016 | Barham | F21S 10/007 |

FOREIGN PATENT DOCUMENTS

| | | |
|---|---|---|
| JP | 2005-075316 A | 3/2005 |
| JP | 2010-132196 A | 6/2010 |
| JP | 2011-068356 A | 4/2011 |
| KR | 1999-0019606 U | 6/1999 |

\* cited by examiner

-- Related Art --

( Mood lamp mode )

MULTIFUNCTIONAL LAMP FOR VEHICLE INTERIOR

CROSS-REFERENCE TO RELATED APPLICATION

This application claims under 35 U.S.C. § 119(a) the benefit of priority to Korean Patent Application No. 10-2014-0151129 filed Nov. 3, 2014, the entire content of which is incorporated herein by reference.

TECHNICAL FIELD

The present disclosure relates to a lamp for a vehicle interior. More particularly, the present disclosure relates to a multifunctional lamp for a vehicle interior capable of selectively using an indirect illumination mood lamp and a direct illumination reading lamp in a vehicle interior.

BACKGROUND

A vehicle has a lamp installed in a roof thereof to provide light at night inside the vehicle. Such a lamp includes, in general, an interior lamp for illuminating a vehicle interior and a reading lamp for illuminating a front side of a passenger and the like.

The interior lamp (room lamp) is installed at the center of a roof for a passenger car such as a sedan, and is installed along a central roof above a passageway for a bus. Such an interior lamp diffuses light to uniformly illuminate the vehicle interior.

However, the vehicle reading lamp intensively irradiates light emitted from a light source at a specific location with a narrow angle, by directly applying the illumination.

FIG. 1 is a perspective view illustrating an example of a reading lamp installed in a vehicle interior.

A reading lamp 1 is usually installed on a roof or upper sides of a vehicle. In a bus, the reading lamp is installed to an upper side of side windows next to passenger seats. The reading lamp 1 for a bus is installed on vehicle shelves or air conditioning ducts, together with air vents for discharging wind, speakers, or the like. Thus, each passenger manually operates a switch to turn on/off the reading lamp.

The conventional reading lamp provides concentrated light to a specific location by simply operating the switch. However, the conventional reading lamp is not suitable for other applications as the concentrated illumination is applied, and thus, an additional ramp is required when using an indirect illumination reading lamp, such as a mood light for softly illuminating a vehicle interior in addition to the above described reading lamp.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art. An aspect of the present inventive concept provides a multifunctional lamp capable of selectively using an indirect illumination mood lamp and a direct illumination reading lamp in a vehicle interior.

According to an exemplary embodiment of the present inventive concept, a multifunctional lamp for a vehicle interior includes a housing having a light source installed therein. An indirect illumination diffusing lens is disposed in front of the housing to diffuse and emit light of the light source. A concentrated illumination light emitting unit moves back and forth while passing through the light diffusing lens. The concentrated illumination light emitting unit emits the light of the light source toward a front side of the housing through an internal passage of the concentrated illumination light emitting unit in the form of concentrated illumination and shields the light diffusing lens from the light when the concentrated illumination light emitting unit moves backward toward the housing so that an end of the concentrated illumination light emitting unit surrounds a periphery of the light source.

Thus, the multifunctional lamp of the present disclosure can be selectively used as an indirection illumination mood lamp and a direct illumination reading lamp by a simple operation of the light emitting unit, and there is no need for a separate a mood lamp and a reading lamp, thus reducing cost and a lamp installation space and improving vehicle marketability.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

Figure 1:
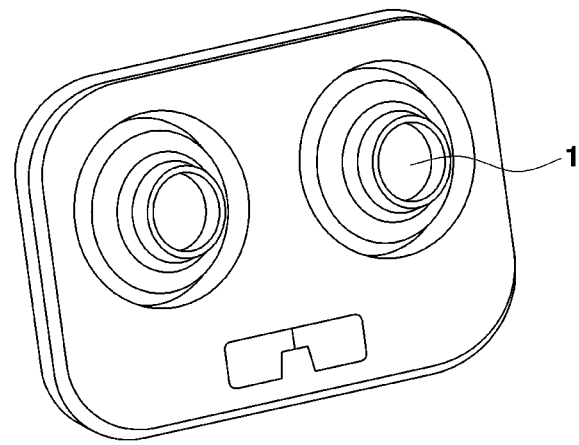
FIG. 1 is a perspective view illustrating a conventional reading lamp.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, an embodiment of the present inventive concept will be described in detail with reference to the accompanying drawings so that the present disclosure can be easily performed by a person having skilled in the art.

The present disclosure relates to a lamp installed inside a vehicle. More specifically, it relates to a multifunctional lamp for a vehicle interior which selectively uses an indirect illumination mood light and a direct illumination reading light by a simple operation.

Figure 2:
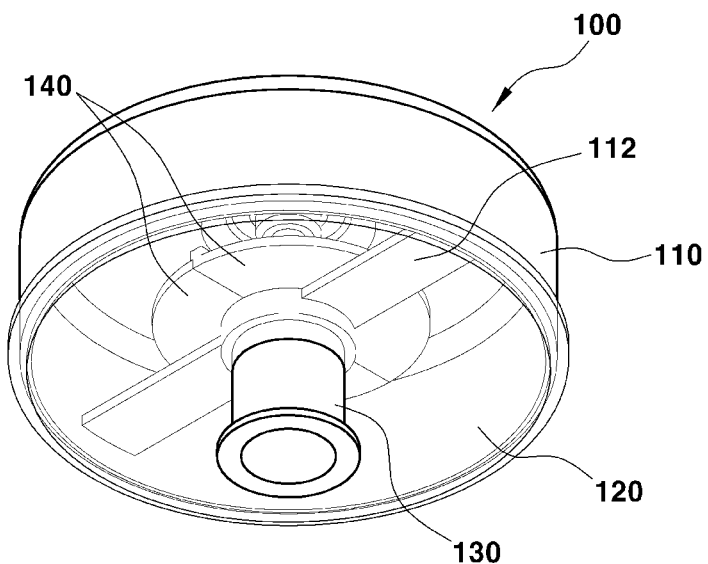
FIG. 2 is a perspective view illustrating a multifunctional lamp for a vehicle interior according to an embodiment of the present inventive concept.
Figure 3:
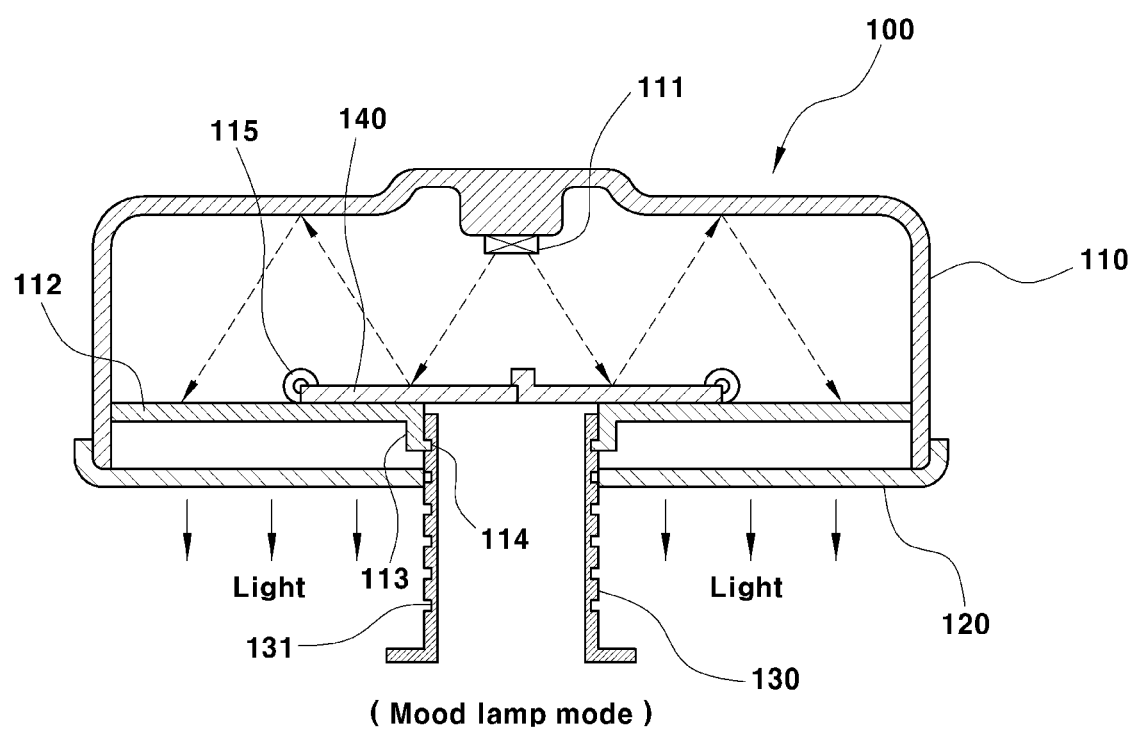
FIGS. 3 and 4 are cross-sectional views illustrating an illumination mode in the multifunction lamp according to an embodiment of the present inventive concept.
Figure 4:
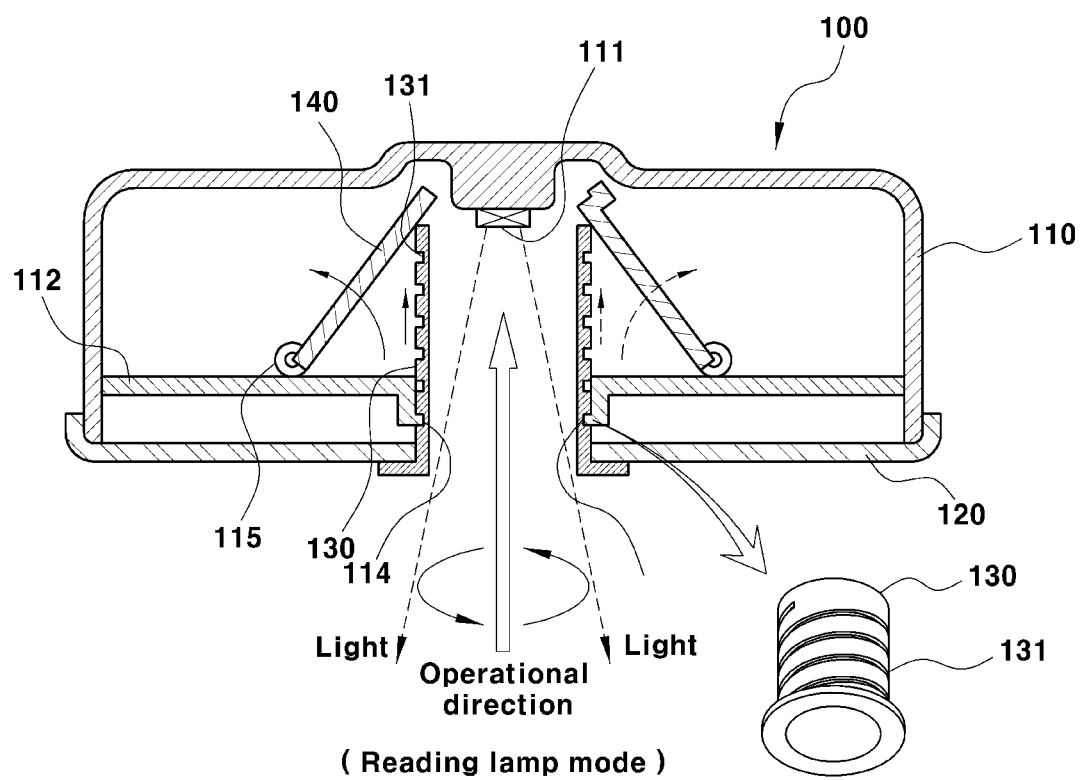

FIG. 2 is a perspective view illustrating a multifunction interior lamp for a vehicle according to an embodiment of the present inventive concept, and FIGS. 3 and 4 are cross-sectional views illustrating an illumination mode state of the multifunction interior lamp for a vehicle illustrated in FIG. 2.

FIG. 4 illustrates a multifunction interior lamp being operated in a direct illumination mode but being used as a reading lamp, and FIG. 3 illustrates a multifunction interior lamp being operated in an indirect illumination mode but being used as a mood lamp.

Referring to FIG. 4, in a multifunction interior lamp 100 for a vehicle according to an embodiment, a screw thread-like spiral groove 131 formed on an outer peripheral surface of a concentrated illumination light emitting unit 130 is illustrated.

As illustrated in FIG. 2, the multifunction interior lamp 100 according to the present disclosure includes a housing 110 with a light source 111 installed inside. An indirect illumination diffusing lens 120 is disposed on a front side of the housing 110 to diffuse and emit light of the light source 111. The concentrated illumination light emitting unit 130 is movable back and forth while having passed through the light diffusing lens 120. The concentrated illumination light emitting unit 130 emits the light of the light source 111 to the front side of the housing 110 through an internal passage in the form of concentrated illumination, while shielding the light as moving toward the housing 110 to surround a periphery of the light source 111.

Although the housing 110 and the lamp 110 have a cylindrical shape, it is intended to show only an example, and the shape can be changed into various shapes such as a rectangular parallelepiped box shape.

The light source 111 that emits the light is installed inside the housing 110, and a light-emitting diode (LED) light source can be used as the light source 111.

The light source 111 may be installed in a rear center of an interior of the housing 110. On an inner surface of the housing 110, a reflective material such as aluminum (Al) capable of reflecting the light emitted from the light source 111 is deposited and coated on the inner surface of the housing 110. In addition, the reflective material is also deposited and coated on a rear surface (rear surface facing the inside of the housing 110) of a light-shielding door 140 and on a rear surface (a rear surface facing the inside of the housing 110) of a support base 112 of the housing 110.

Thus, the light can reflect inside the housing 110 while generating multi-reflection of the light emitted from the LED light source 111, and the reflected light is evenly diffused and discharged through the light diffusing lens 120.

The light diffusing lens 120 covers a front surface of the housing 110, and may be made of plastic (e.g., Polycarbonate) or the like to diffuse and emit the light inside the housing 110.

The light from the light source 111 inside the housing is transmitted and emitted through the light diffusing lens 120 when functioning as a mood lamp of the indirect illumination, and it is possible to variously implement the color of illumination of the mood lamp depending on a color of the light diffusing lens 120.

The concentrated illumination light emitting unit 130 may have a tubular shape to allow the light to pass through an interior thereof and may have a circular tube shape.

The concentrated illumination light emitting unit 130 is disposed adjacent to the light source 111 while passing through a central portion of the light diffusing lens 120, and is mounted to the support base 112 to be movable forward and backward while passing through the light diffusing lens 120.

The concentrated illumination light emitting unit 130 may move forward to protrude to a front side of the light diffusing lens 120, or may move backward to be inserted to the rear of the light diffusing lens 120 and into the housing 110. The concentrated illumination light emitting unit 130 penetrates through the through hole 113 of the support base 112 at the front side in the housing 110.

Furthermore, the concentrated illumination light emitting unit 130 may move back and forth by a user operation or may be fixed at the moved position. According to an exemplary embodiment, the spiral groove 131 as illustrated in FIG. 4 is formed on the outer peripheral surface of the light emitting unit 130, and a projection 114 to be inserted into the spiral groove 131 is formed on an inner surface of the through hole 113.

That is, the light emitting unit 130 is assembled onto the inner peripheral surface of the support base 112 by screw-fastening, and therefore, the light emitting unit 130 may move back and forth and then fixed when the light emitting unit 130 rotationally operates.

Referring to FIG. 4, as the light emitting unit 130 moves rearward after rotating, the light emitting unit 130 seals the periphery of the light source 111 while surrounding the light source 111. Here, the light of the light source 111 may emit and irradiate forward only via the internal passage of the light emitting unit 130, without leaking outside the light emitting unit 130. Thus, the lamp 100 of the present disclosure can be used as a reading lamp through such a concentrated illumination.

On the other hand, when the light emitting unit 130 moves forward to protrude to a front side of the light diffusion lens 120 as illustrated in FIG. 3, the light of the light source 111 may emit through the light diffusion lens 120 after reflecting by the inner surface of the housing 110 and the rear surface of the light-shielding door 140. Here, the multifunctional lamp 100 according to the present disclosure can be as a mood lamp in the form of soft indirect light.

The lamp 100 of the present disclosure further includes the light-shielding door 140 for shielding the emission of light, when the lamp 100 is used as the light emitting unit 130 which moves forward while the internal passage of the light emitting unit 130 is closed.

The light-shielding door 140 opens and closes the internal passage of the light emitting unit 130 in conjunction with the front and back movement of the light emitting unit 130, and is rotatably hinged to the support base 112 so that the light emitting unit 130 may push and rotate the light-shielding door 140 to the inside of the housing 110 while moving rearward.

Further, the light-shielding door 140 elastically rotates by a spring 115 assembled to the hinge coupling portion. After the light-shielding door 140 rotates to the inside of the housing 110 when the light emitting unit 130 moves rearward, the light-shielding door 140 moves forward and rotates by the elastic restoring force of the spring 115, when the light emitting unit 130 moves forward again.

That is, the light-shielding door 140 is open after rotating to the inside of the housing 110 by pushing when the light emitting unit 130 moves backward, and the light-shielding door 140 is closed by the spring 115 when the light emitting unit 130 moves forward.

The light-shielding door 140 is closed to block the internal passage of the light emitting unit 130 when the light emitting unit 130 moves forward. At this time, since the light of the light source 111 indirectly emits the light only through the light diffusion lens 120, the lamp 100 may be used as the mood lamp (see FIG. 3).

Since the light-shielding door 140 blocks the internal passage of the light emitting unit 130, the light from the light source 111 does not emit through the internal passage of the light emitting unit 130, and the light in the housing 110 emits toward outside only through the area around the light-shielding door 140 of the entire area of the light diffusing lens 120.

In contrast, when a user moves the light emitting unit 130 backward by rotating and the light emitting unit 130 enters the housing 110, the light-shielding door 140 rotates toward the inside of the housing 110, while being pushed back by the light emitting unit 130, thereby opening the internal passage of the light emitting unit 130 (see FIG. 4).

At this time, the light emitting unit 130 blocks the light source 111 by surrounding the periphery thereof to block the light emitted laterally from the light source 111, and, the light from the light source 111 emits as the concentrated illumination only through the internal passage of the light emitting unit 130. Accordingly, the lamp 100 performs the function of the reading lamp.

When the light emitting unit 130 moves forward by rotating in the opposite direction, the light-shielding door 140 automatically returns and rotates by an elastic restoring force of the spring 115, and the function of the mood lamp can be executed again while the internal passage of the light emitting unit 130 is closed.

Figure 5:
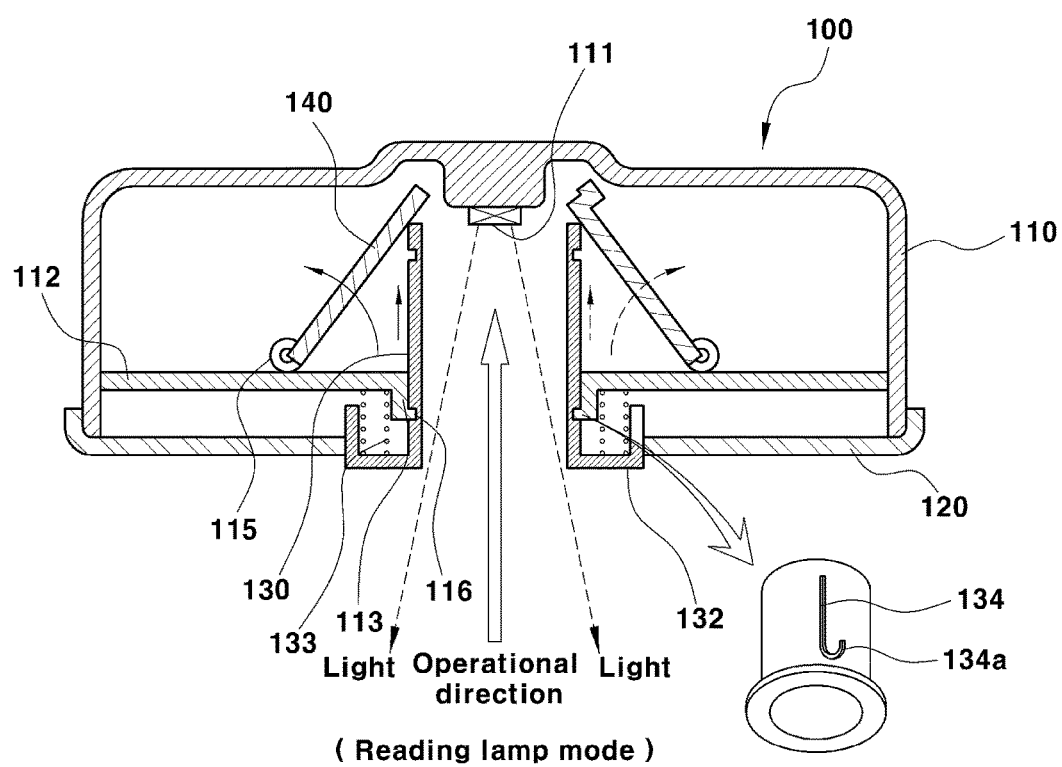
FIG. 5 is a cross-sectional view of a multifunction lamp for a vehicle interior according to another embodiment of the present inventive concept.

FIG. 5 is a cross-sectional view illustrating a multifunction interior lamp for a vehicle according to another embodiment of the present inventive concept, which illustrates a direct illumination mode used for the reading lamp.

With reference to FIG. 5, an annular groove 134 formed on an outer peripheral surface of the concentrated illumination light emitting unit 130 in the multifunction interior lamp 100 is illustrated.

The light emitting unit 130 may be pushed by a return spring 133, a projection 116, and a groove 134, and the remaining constituent elements are the same as those in the embodiments of FIGS. 2 to 4.

A spring support end 132 protrudes from a distal end of a front end of the light emitting unit 130 for pushing operation, and the return spring 133 is installed between the spring support end 132 and the support base 112.

Further, a guide means is provided between the light emitting unit 130 and the support base 112. The guide means fixes a moved position of being moved backward so that the light emitting unit 130 surrounds the periphery of the light source 111, while guiding the front and back movement of the light emitting unit 130.

In the present disclosure, the guide means includes the groove 134 and the projection 116. The groove 134 is formed lengthily back and forth on the outer peripheral surface of the light emitting unit 130, and its end portion is formed as a locking portion 134a having a hook shape. The projection 116 is formed in the through hole 113 of the support base 112 and is guided along the groove while being inserted in the groove 134 of the light emitting unit 130.

Thus, when a user pushes light emitting unit 130 backward while the light emitting unit 130 moves forward to protrude toward the front of the light diffusion lens 120, the projection 116 is guided along the groove 134 of the light emitting unit 130, and simultaneously the light emitting unit 130 enters the inside the housing 110.

At this time, the light-shielding door 140 rotates to the inside of the housing 110 to open the internal passage of the light emitting unit 130.

When the light emitting unit 130 moves rearward maximally, the projection 116 is located at the front end of the groove 134 of the light emitting unit 130, and when the light emitting unit 130 is released after slight rotation, the projection 116 enters the locking portion 134a and then is locked thereto.

Since the forward movement of the light emitting unit 130 is constrained with the projection 116 being locked to the locking portion 134a, the light emitting unit 130 surrounds the periphery of the light source 111, and thus, the lamp 100 performs the function of the reading lamp as described above.

When the light emitting unit 130 is turned on after slightly pushing, the projection 116 of the support base 112 moves out of the locking portion 134a, and the light emitting unit 130 automatically moves forward by the elastic restoring force of the return spring 133. Here, the projection 116 of the support base 112 is guided along a straight section of the groove 134.

After the light-shielding door 140 is closed again, in a state in which the light emitting unit 130 protrudes toward the front of the light diffusion lens 120, and the lamp 100 performs the function of the mood lamp as described above.

In this way, according to the lamp of the present disclosure, it is possible to selectively use the indirect illumination mood lamp and the direct illumination reading lamp through the simple operation of the light emitting unit.

While the embodiments of the present inventive concept have been described in detail, the scope of the disclosure is not limited thereto, and various modified and improved aspects of a person skilled in the art obtained by utilizing the basic concept of the invention as defined by the following scope of claims also fall within the scope of the present disclosure.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:
1. A multifunctional lamp for a vehicle interior, comprising:
a housing having a light source installed therein and a support base installed therein at the front side of the housing;

an indirect illumination diffusing lens disposed in front of the housing to diffuse and emit light of the light source;

a concentrated illumination light emitting unit connected to the support base moving back and forth while passing through the light diffusing lens, the concentrated illumination light emitting unit emitting the light of the light source toward a front side of the housing through an internal passage of the concentrated illumination light emitting unit in the form of concentrated illumination and shielding the light diffusing lens from the light when concentrated illumination light emitting unit moves backward toward the housing so that an end of the concentrated illumination light emitting unit surrounds a periphery of the light source; and a light-shielding door hingedly connected to the support base being capable to open and close the internal passage of the concentrated illumination light emitting unit in conjunction with the forward and backward movement of the concentrated illumination light emitting unit.

2. The multifunctional lamp of claim 1, wherein the concentrated illumination light emitting unit is disposed adjacent to the light source when the concentrated illumination light emitting unit moves backward and penetrates through a central portion of the light diffusing lens, and wherein the concentrated illumination light emitting unit has a tubular shape which shields the light emitted laterally from the light source by surrounding the periphery of the light source.

3. The multifunctional lamp of claim 1, wherein the concentrated illumination light emitting unit passes through a hole of the support base.

4. The multifunctional lamp of claim 3, wherein a return spring is disposed between the concentrated illumination light emitting unit and the support base, such that the concentrated illumination light emitting unit moves backward by pushing or moves forward by an elastic restoring force of the return spring.

5. The multifunctional lamp of claim 4, further comprising:

a guide assembly is provided between the concentrated illumination light emitting unit and the support base, wherein the guide assembly guides the movement of the concentrated illumination light emitting unit and fixes the concentrated illumination light emitting unit after moving so that the end of the concentrated illumination light emitting unit surrounds the periphery of the light source.

6. The multifunctional lamp of claim 5, wherein the guide assembly includes:

a groove formed lengthily back and forth on an outer surface of the concentrated illumination light emitting unit and having a locking portion which is curved forwards in a ring shape at an end portion of the groove; and a projection formed in the through hole of the support base and guided inside the groove of the concentrated illumination light emitting unit.

7. The multifunctional lamp of claim 3, wherein the through hole comprises a projection formed on an inner surface thereof, the concentrated illumination light emitting unit comprises a spiral groove formed on an outer surface thereof so that the projection is inserted therein, and the concentrated illumination light emitting unit is fixed to the support base after rotatably moving in the through hole as the projection is inserted in the spiral groove.

8. The multifunctional lamp of claim 1, the light-shielding door opens and closes a through hole of the support base through which the concentrated illumination light emitting unit passes, and has a spring for elastic rotation at a connection portion of the light-shielding door and the support base, and the light-shielding door rotates toward a back side of the housing to open the through hole as the concentrated illumination light emitting unit moves backward, and rotates to close the through hole by an elastic restoring force of the spring as the concentrated illumination light emitting unit moves forward.

9. The multifunctional lamp of claim 8, wherein the light-shielding door includes a reflective material coated on a rear surface thereof to reflect the light of the light source towards the back side of the housing.

10. The multifunctional lamp of claim 1, wherein the housing includes a reflective material coated on an inner surface thereof to reflect the light of the light source.

* * * * *